C. H. SPOONER.
MACHINE FOR SAWING BARREL HOOPS.
APPLICATION FILED NOV. 2, 1914.
1,175,832.
Patented Mar. 14, 1916.
5 SHEETS—SHEET 1.
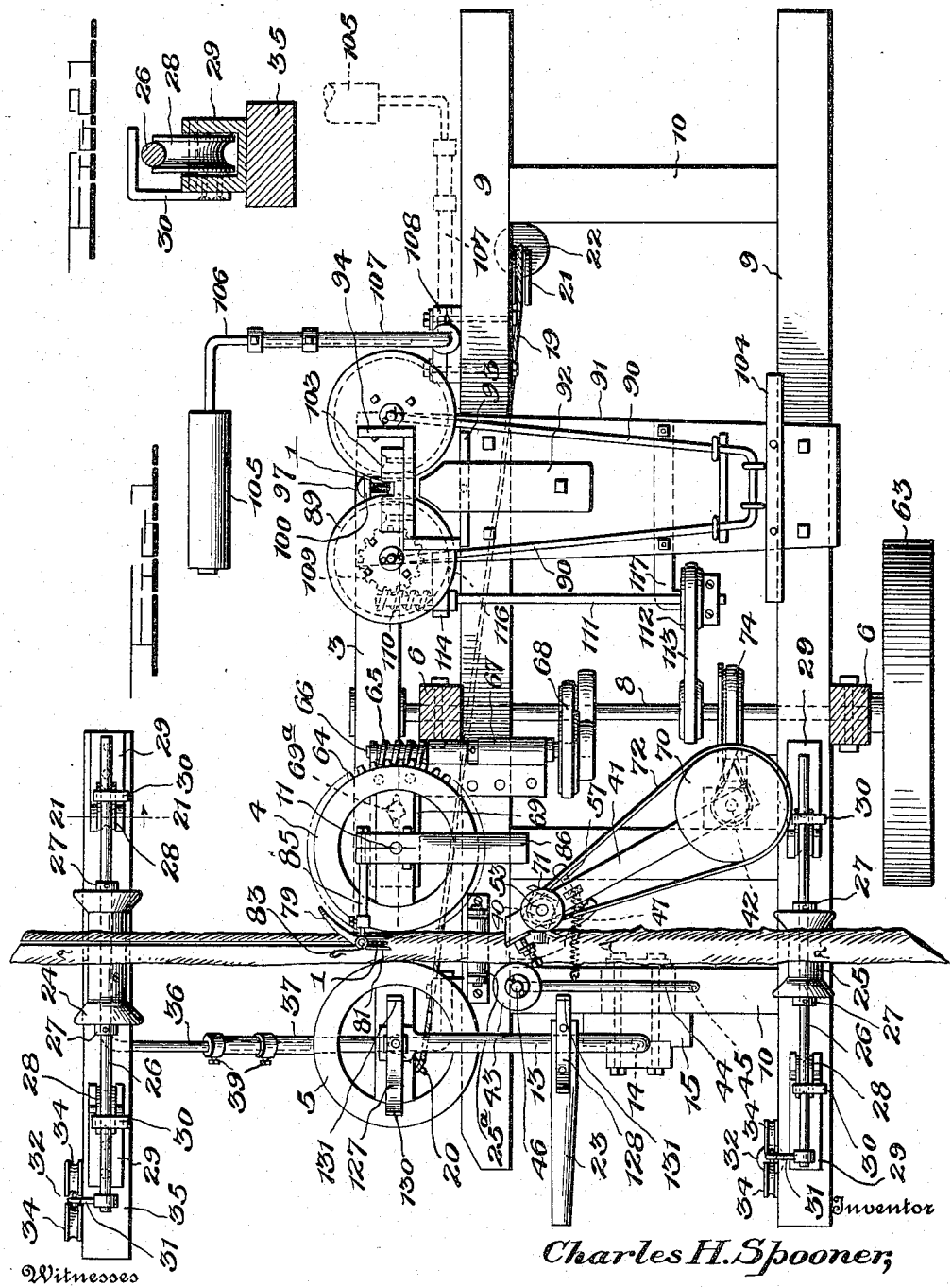
Witnesses
Chas. L. Griesbauer
John S. Powers
Inventor
Charles H. Spooner,
By 
Attorney C. H. SPOONER.
MACHINE FOR SAWING BARREL HOOPS.
APPLICATION FILED NOV. 2, 1914.
1,175,832.
Patented Mar. 14, 1916.
5 SHEETS—SHEET 2.
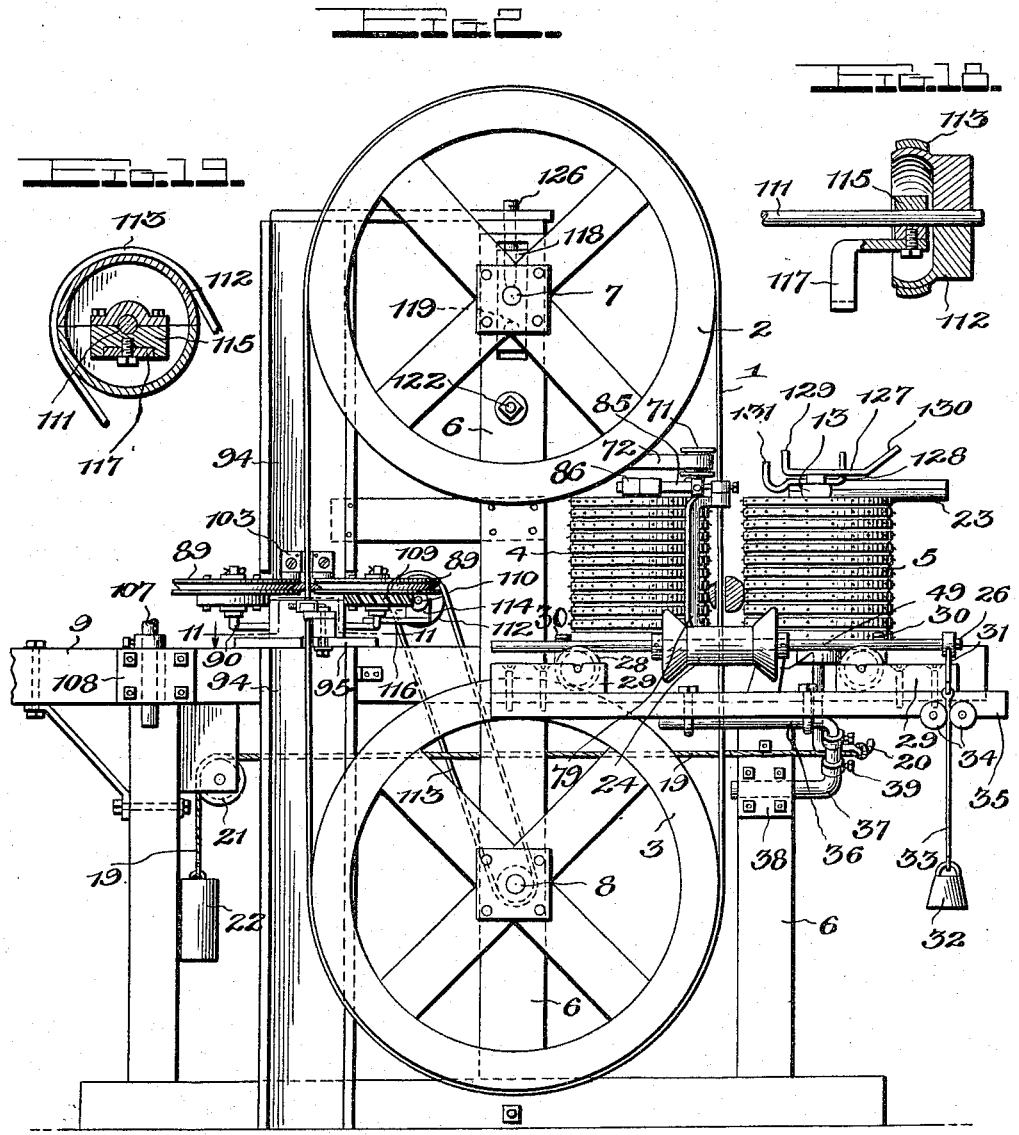

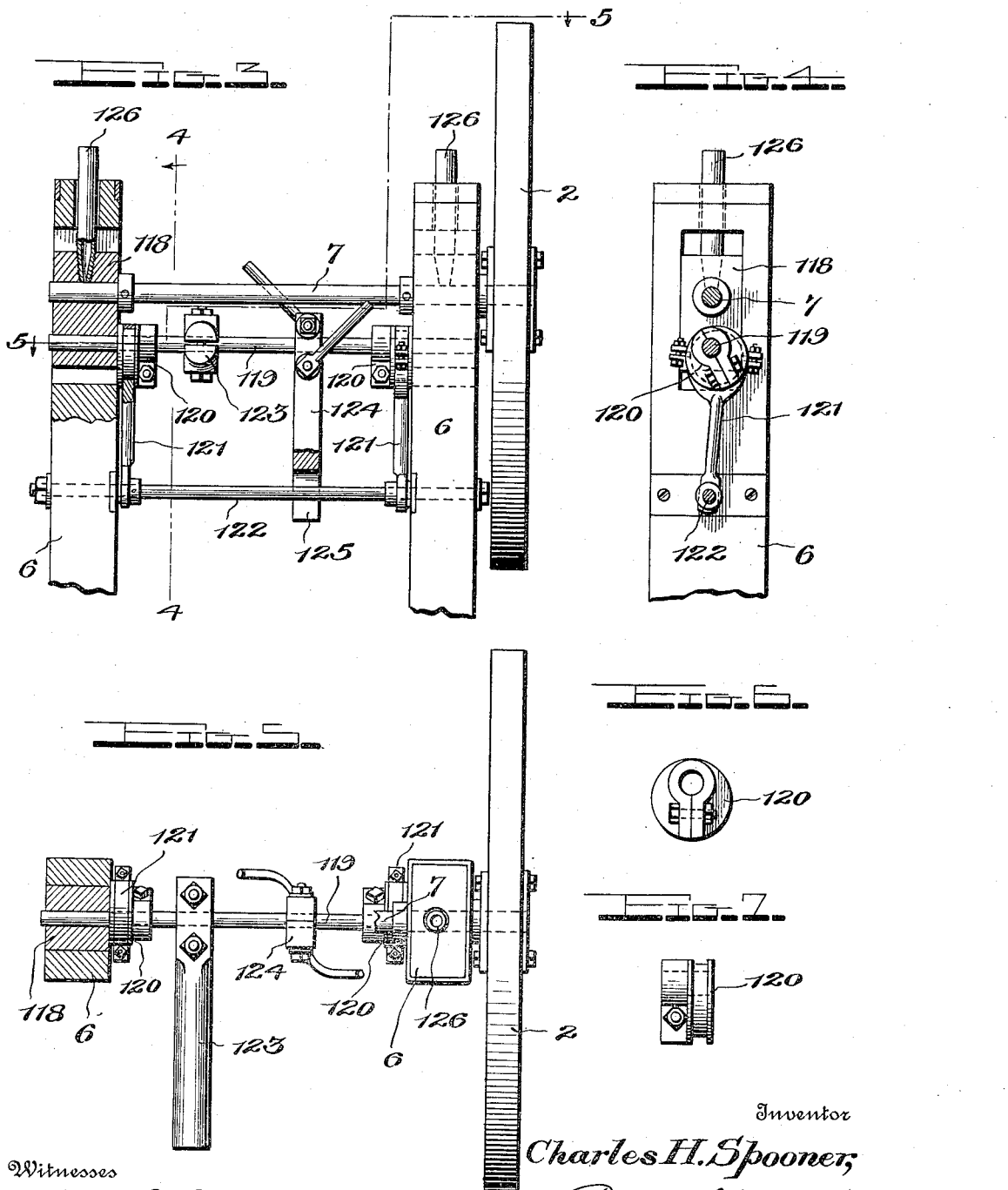

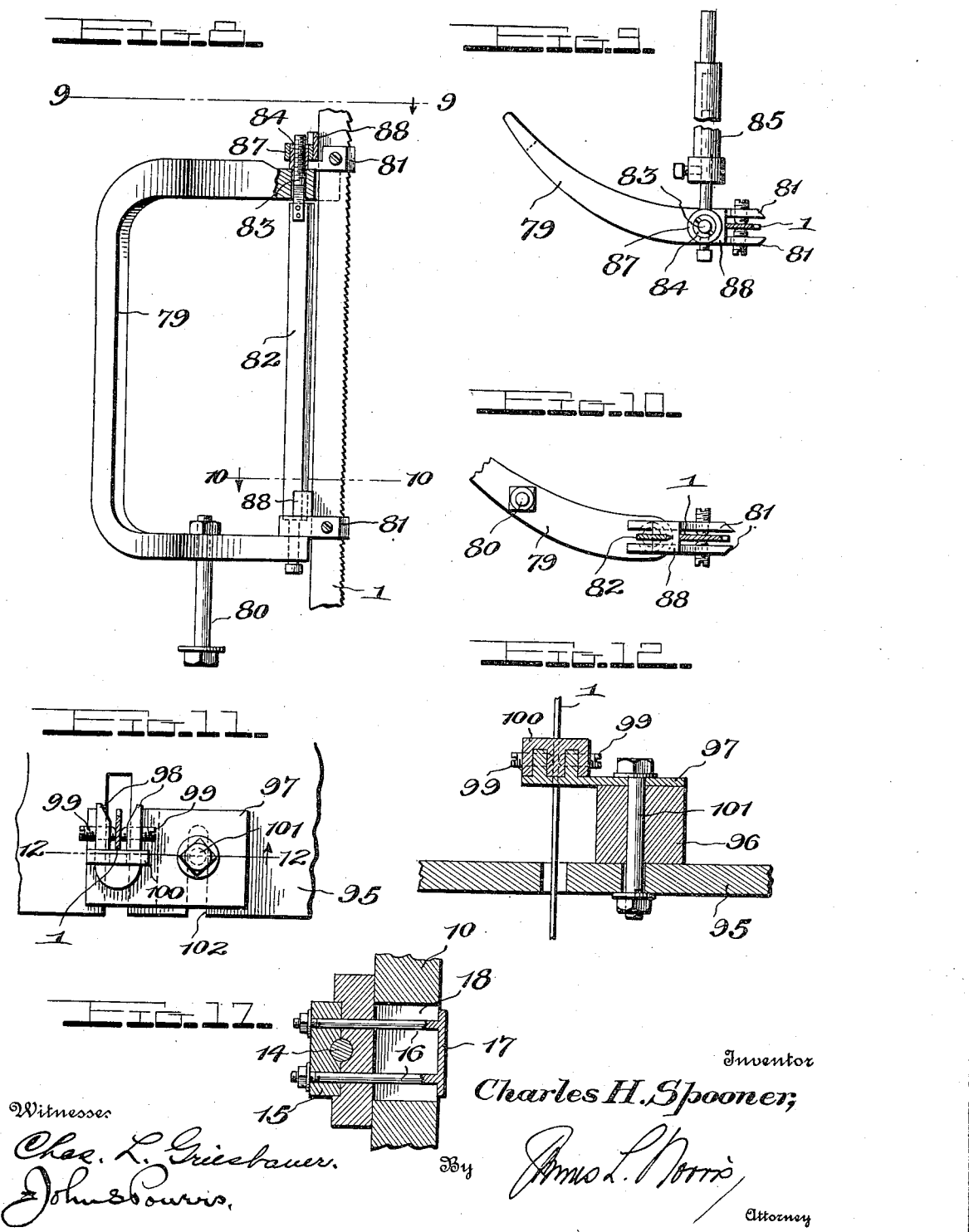

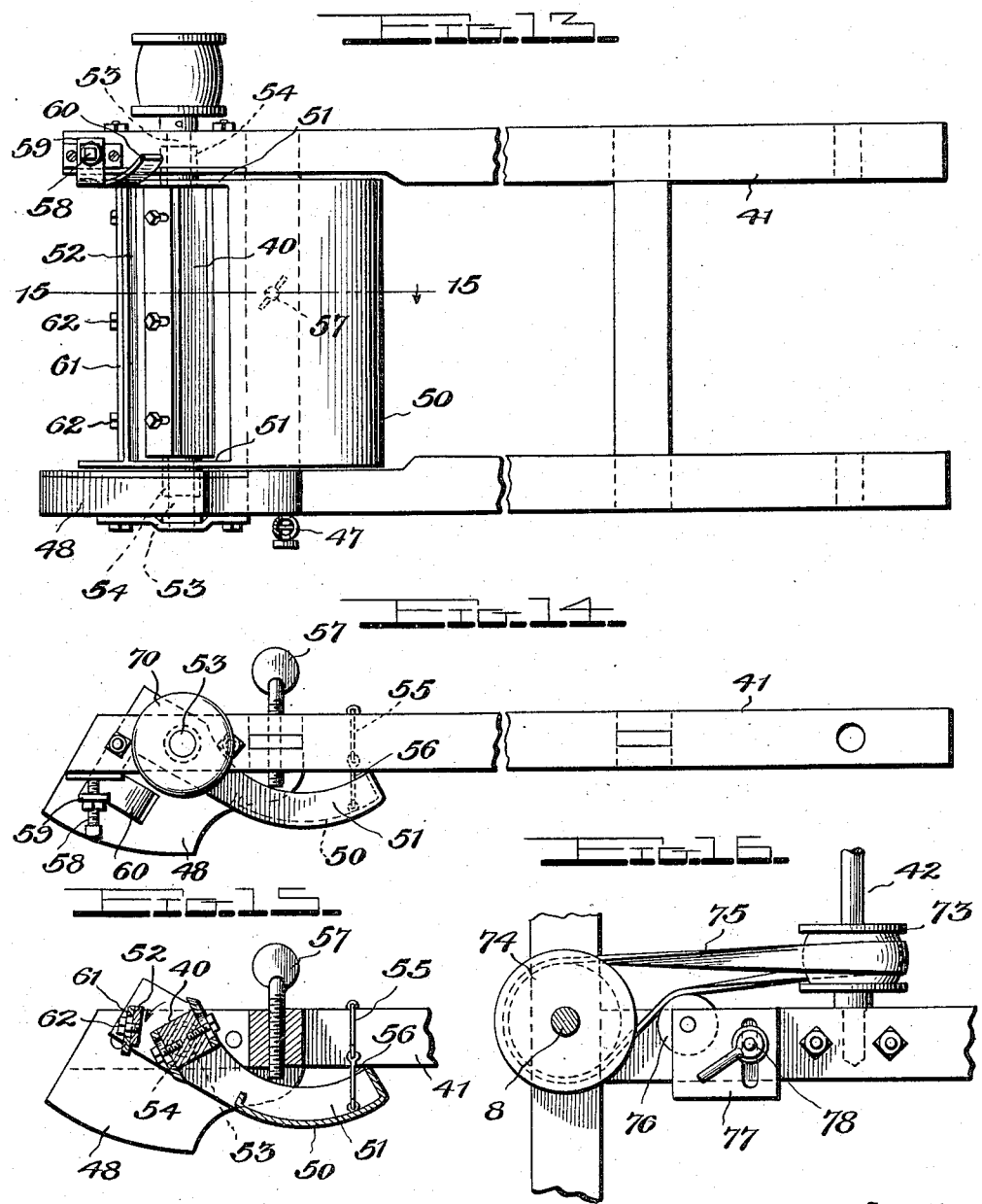

UNITED STATES PATENT OFFICE.

CHARLES HAROLD SPOONER, OF PRINCETON, MAINE.

MACHINE FOR SAWING BARREL-HOOPS.

1,175,832. Specification of Letters Patent. Patented Mar. 14, 1916.

Application filed November 2, 1914. Serial No. 869,931.

*To all whom it may concern:*

Be it known that I, CHARLES H. SPOONER, a citizen of the United States, residing at Princeton, in the county of Washington and State of Maine, have invented new and useful Improvements in Machines for Sawing Barrel-Hoops, of which the following is a specification.

This invention relates to improvements in machines for sawing barrel hoops, proposing a construction of that general type wherein the young trees or saplings from which the hoop-lengths are to be sawed are fed in relation to an endless saw-blade.

The improvements consist in various detail features of structure, relation, and combination having for their objects to promote facility in the operation of a machine of the type referred to; to enable such machine to render good service, notwithstanding variations in the size of the stock upon which it operates or irregularities of the surface of such stock; to secure excellence of quality in the finished output; to provide for a speedy hoop sawing operation; and to obtain the greatest number of uniform hoop-lengths from each young tree or sapling to be sawed, thereby obviating waste.

The above and other advantages will appear at length as the description proceeds.

An embodiment of the invention is illustrated in the accompanying drawings, wherein—

Figure 1 is a sectional plan view of a machine in which the features of the invention are incorporated; Fig. 2 is a front elevation thereof; Fig. 3 is a detail elevation, partly in section showing a means for tensioning the band saw; Fig. 4 is a sectional view on the line 4—4 of Fig. 3; Fig. 5 is a sectional view on the line 5—5 of Fig. 3; Figs. 6 and 7 are detail views of eccentrics included as elements of the band saw tensioning means; Fig. 8 is a detail elevation, partly in section, of a guide for that portion of the band saw which saws the hoop lengths from the stock; Fig. 9 is a plan view of the saw guide shown in Fig. 8; Fig. 10 is a detail sectional view on the line 10—10 of Fig. 8; Fig. 11 is a detail view of a guide for that length of the band saw which effects the hoop splitting or re-sawing operation, on the line 11—11 of Fig. 2; Fig. 12 is a detail sectional view on the line 12—12 of Fig. 11; Fig. 13 is a detail elevation of the knot-planer and its appurtenances; Fig. 14 is a top plan view thereof; Fig. 15 is a sectional view on the line 15—15 of Fig. 13; Fig. 16 is a detail view of a part of the belt gearing for operating the knot planer; Fig. 17 is a detail sectional view of an adjustable bearing for the frame which carries the pressure roll; Figs. 18 and 19 are detail sectional views showing a bearing for the operating shaft of the hoop splitting or re-sawing mechanism; Fig. 20 is a detail front elevation of certain parts which are hidden from view in the elevation of Fig. 2, and Fig. 21 is a detail sectional view on the line 21—21 of Fig. 1.

Similar characters of reference designate corresponding parts throughout the several views.

The hoop-lengths are removed from a young tree or sapling by the action of an endless band saw 1 working upon upper and lower pulleys 2 and 3. The saw 1 is vertically disposed and the tree from which the hoop-lengths are to be removed is fed horizontally in relation to said saw by a means which includes essentially an upright feed roll 4 and an upright pressure roll 5.

The elements aforesaid together with the various other elements and their appurtenances are supported by a suitable framework which includes parallel upright bars 6 having suitable journals for the shafts 7 and 8 of the respective pulleys 2 and 3, transverse bars 9 and parallel longitudinal bars 10 extending between and connecting the bars 9.

The saw 1 and the rolls 4 and 5 are arranged adjacent the front of the machine. The rolls 4 and 5 may be of any suitable construction for the purposes in view. Thus, these rolls may be made of wood and grooved circumferentially, as shown, with their surfaces suitably toothed for feeding purposes. For this purpose, it is preferred to use brads, the projecting portions of which are sharpened and have their edges disposed in the direction of the grain of the wood. The feed roll 4 revolves about a fixed axis 11 but the axis 12 of the pressure roll 5 is movable. For this purpose, the axis 12 is supported at the forward end of a pivotally mounted frame 13, (Fig. 1), which has at its rear side a depending extension 14 journaled in bearings 15 secured to an adjacent bar or bars 10 and preferably connected to said bar for adjustment lengthwise thereof. The bearings 15 of which two are provided are arranged in upper and lower relation. The upper bearing only is shown in Fig. 1 but both bearings are similar in construction and a disclosure of one will, therefore, suffice for both. The detail construction of the bearing 15 is shown in Fig. 17. The members of the bearing 15 are held in relation to one another and to the adjacent bar 10 by a pair of bolts 16 secured to a plate 17. The bar 10 has a slot 18 through which the bolts 16 extend and the plate 17 fits against the inner face of the bar 10. Obviously, upon loosening the nuts on the outer ends of the bolts 16, the bearing 15 may be adjusted within the limits allowed by the slot 18, lengthwise of the bar 10 against which said bearing is held and when the desired adjustment of the bearing has been made, it is held against accidental movement by tightening said nuts. The object of providing for the adjustment of the bearings 15 in the manner described is in order to vary the position of the pressure roll 5, relatively to the feed roll 4, to compensate for any tendency of the saw, by virtue of its downward pressure, to produce a gradual twist of the hoop throughout the length thereof. This tendency, when it is evident in particular cases, may be effectively resisted or counteracted by positioning the pressure roll 5 slightly back of the feed roll 4.

The pressure roll is held against the stock by any suitable means. It is preferred, however, to employ a cable 19 having one end secured to a hook 20 depending from the lower bar of the frame 13 at the forward end thereof, and having its free end which depends from a pulley 21 suitably secured in the frame of the machine provided with a weight 22. In order that the frame 13 may be conveniently manipulated whenever, for any particular reason, it may be desired to relieve the pressure on the tree or to move the pressure roll from the feed roll, the upper bar of said frame is provided with a laterally projecting arm 23 which may be used as a handle.

The tree, as above stated, is fed horizontally to the saw 1 by the coöperation of the rolls 4 and 5 and it is supported and steadied in its horizontal position by idlers 24 and 25 located, respectively, at suitable distances in the rear and in advance of the rolls 4 and 5 and by an intermediate idler 25ᵃ located just behind the rolls 4 and 5. The idlers 24 and 25 and their appurtenances are similar in construction and arrangement. Each idler rotates freely on a rod 26, being held against sliding movement on said rod by stop collars 27. The rod 26 is supported by grooved pulleys 28, the trunnions of which are journaled in bearings 29. By mounting the rod 26 upon the pulleys 28, said rod is free to move back and forth longitudinally or in the direction of its axis and such longitudinal movements of the rod 26 and, therewith, of the idler mounted thereon are consequent to the passage of a bowed or bent portion of the stock over said idler. The longitudinal movements of the idlers are transverse to the rolls 4 and 5 and the objects of thus providing for such longitudinal movements of the idlers is to enable the roll 5 to hold the stock at all times against the roll 4, regardless of bows or bends in the stock. Displacement of the rod 26 from the pulleys 28 is prevented by angle pieces 30 secured to the bearings 29 and formed to overhang said rod but not to contact therewith. In order to aline the idlers with the space between the rolls 4 and 5, each rod 26 has at one end thereof an arm 31 which carries a weight 32 supported by a cord 33 passing between a pair of fixed pulleys 34. The weights 32 are not heavy enough to interfere with the requisite longitudinal movements of the idlers, as above explained, but they are sufficiently heavy to aline the idlers with the space between the rolls 4 and 5 during the periods when no stock is passing through the machine and their function is, therefore, to position the idlers at the completion of each sawing operation in readiness to properly receive the stock to be passed through the machine in connection with the next sawing operation.

The bearings 29 and pulleys 34 which form parts of the organization of the rear idler 24 are mounted upon the rear frame bar 9. The bearings 29 and pulleys 34 which form parts of the organization of the front idler 25 are mounted upon a base piece 35 which is supported at a suitable distance beyond the front of the machine by a bracket composed of angular members 36 and 37, one of which telescopes within the other. The angular leg of the bracket member 36 extends under the base piece 35 and is suitably secured or clamped thereto and the angular leg of the bracket 37 is held by a suitable clamp 38 which is secured to a front bar of the frame of the machine. The bracket composed of the members 36 and 37 may be adjusted to determine the elevation of the idler 25 by suitable adjustment of the upward angle of the forwardly projecting portion of the member 37; and said bracket may be further adjusted to determine the distance of the idler 25 from the rolls 4 and 5 by suitably moving the telescoping legs of the members 36 and 37 relatively to one another, said telescoping legs being normally held against relative movement by set screws 39.

During its horizontal movement and before it is acted upon by the saw 1, the tree passes in relation to a knot-planing instrumentality which reduces surface irregularities. The essential element of this instrumentality is a rotary planer 40 mounted at the forward end of a frame 41 which at its rear end is pivoted on a vertical shaft 42 journaled in bearings secured to the rear bars 9. The action of the planer 40 is promoted by an upright pressure roll 43 which bears upon the side of the tree opposite to that acted upon by the planer and is mounted upon a swinging arm 44. The arm 44 has at its rear end a depending extension 45 which is journaled in a bearing in the adjoining frame bar 10 and at its forward end an upright extension 46 which constitutes the axis of the roll 43. The roll 43 and the planer 40 are conjointly held against the tree passing therebetween by a retractile coil spring 47 having its ends secured to the arm 44 and to the lower bar of the frame 41.

In order to prevent injury to the knives of the planer when the rear end of the tree passes thereby, the lower bar of the frame 41 is provided at its forward end with a laterally projecting toe 48 which, by engagement with the extension 46 of the arm 44 prevents the pressure roll 43 from striking against the knives of the planer. Contact of the rolls 4 and 5 under the same condition, i. e., when the rear end of the tree passes thereby, is prevented by a stop 49 secured to an upright bar of the frame of the machine in a position to engage the lower bar of the frame 13 and thereby limit the inward movement of the said frame. The stop 49 may, as a matter of convenience, be formed as an upright extension of the clamp 38, (Figs. 2 and 20).

The action of the planer 40 is further promoted by a guard, (Figs. 13 to 15), comprising a plate 50 in the rear of said planer and carried by upper and lower arms 51 and a bar 52 in advance of said planer and also carried by said arms. The arms 51 are pivoted intermediate the plate 50 and bar 52, and near the latter, upon the planer shaft 53 as an axis, the bearings for said shaft at the upper and lower ends thereof having bearing thimbles 54 for the arms 51. The plate 50 is urged inwardly, i. e., away from the tree by a spring 55 having its upper end secured by a link 56 to said plate and having its lower end secured to the lower bar of the frame 41. The inward movement of the plate 50 is limited by a set screw 57 threaded through a vertical bar of the frame 41. The inward movement of the bar 52 is limited by a screw 58 threaded through an angular projection 59 provided on the upper arm 51 suitably in advance of said bar and said screw functions as a stop by engaging the upper bars of the frame 41. The projection 59 has combined therewith a rearwardly and upwardly inclined tongue 60, the office of which is to prevent said projection from catching against any irregularities on the surface of the tree. It is preferred that the bar 52 may be adjustable to stand out to a greater or less extent relatively to the planer 40 and for this purpose, said bar is mounted upon a fixed bar 61, being secured in position by screws 62 and having slots through which said screws extend. By suitably selecting the position of the bar 52 upon the bar 61, the depth to which the blades of the planer will work can be regulated as desired.

The office of the planer guard is to insure that the bark surface of the hoop-length is approximately regular. The bar 52 establishes a substantially uniform relation between the planer and the surface upon which it acts.

The tree which passes through the machine slides across the plate 50 and the bar 52 which elements contacting with the surface of the tree normally space the planer therefrom. When a knot or other surface projection engages the plate 50, the latter yields until said knot or projection has passed thereby, at which time the knot or projection will be in the path of the blades of the planer and will be acted upon by said planer in the course of the movement of the tree, the depth to which the planer cuts being regulated by an adjustment of the bar 52 as above explained. In this way, compensation is provided for surface irregularities and it is assured that the bark surface of the hoop-length is approximately regular or smooth.

The saw, the feed roll, and the planer are positively driven. For this purpose, the shaft 8 which carries the lower band-saw pulley 3 is utilized as a power shaft and accordingly is provided at its rear end with a pulley 63 by means of which it may be belted to a suitable motor or line-shaft. The saw 1 is, of course, directly driven from the shaft 8.

The feed roll 4 is driven from the shaft 8 through the intermediary of suitable gearing, preferably comprising a worm wheel 64 secured upon the lower end of said feed roll, and a worm 65 in mesh with said worm wheel. The worm 65 is mounted on the front end of a short shaft 66 arranged above the shaft 8 and parallel thereto. The shaft 66 is journaled in a suitable bearing 67 which is secured upon the upper front frame bar 9 and at its rear end is belted, as by gearing 68, to the shaft 8. The bearing 67 is provided with a laterally projecting bracket 69 which carries the axle 11 upon which the roll 4 revolves. The bracket 69 includes an upper member adjustably superimposed upon a lower member, said upper member carrying the rod 11 and being held against movement relatively to the lower member by a screw fastening 69ª passing through a slot in said upper member and threaded into said lower member. Obviously, by suitable adjustment of the upper member of the bracket 69, the position of the roll 4 relative to the saw may be selected to cause the hoops to have any desired thickness.

The planer 40 is driven by the shaft 42 which, as above stated, forms the pivot of the planer supporting frame 41 and for this purpose, the shaft 42 and the planer shaft 53 are provided at their upper ends with pulleys 70 and 71, respectively, connected by a belt 72. The shaft 42 is, in turn, driven from the shaft 8, the gearing preferably employed for this purpose, (Fig. 16), comprising a belt pulley 73 on the lower end of the shaft 42, a belt pulley 74 on the shaft 8, a belt 75 connecting said pulleys, and an idler 76 over which the lower run of the belt 75 is trained. In order that the tension of the belt 75 may be regulated, the bearing 77 for the idler 76 is connected to a horizontal frame bar for vertical adjustment, a pin and slot connection and a tightening nut 78 being preferably used for this purpose.

The saw 1 acts on the tree as it passes between the rolls 4 and 5 and said saw at suitably located points above and below the tree is positively guided. The saw guide, (Figs. 8 to 10), preferably consists of an upright frame 79 suitably secured to the frame of the machine as by a depending bolt connection 80, and projecting forwardly in generally tangential relation to the roll 4. The frame 79 has at its upper and lower ends and at its rear side spaced cheeks 81 through which the saw passes. The cheeks 81 carry screws, preferably of hard wood, which are arranged at opposite sides of the saw and by which the working portion of the saw is steadied and directed. The frame 79 also carries in advance of the cheeks 81 a blade 82 which alines with the working portion of the saw and fits in the scarf or kerf produced by the saw. The blade 82, which has a beveled front edge, tends to spread the severed hoop-length somewhat from the trunk of the tree and prevents the saw from being hampered in its action by the side pressure of the tree. The blade 82 is suitably tensioned. For this purpose, its lower end has a head engaging against the underside of the frame 79 and its upper end is provided with a threaded stem 83 upon which is secured a tensioning nut 84. The opening in the upper bar of the frame 79 through which the stem 83 passes is square and the lower portion of said stem is also square in order that the stem may be held against turning movement.

In order to prevent the upper portion of the frame 79 from springing in toward the feed roll a brace 85 is employed. The brace 85 extends between the frame 79 and a block 86 secured upon the upper end of the axle 11 of the roll 4, its inner end being socketed in said block and its outer end having a collar 87 which surrounds the nut 84. The brace 85 is preferably made, as shown, in telescoping sections held against relative movement by a set screw, in order that it may be lengthened or shortened in accordance with variations in the diameter of the roll 4.

The saw guide is completed by blocks 88, preferably of hard wood, which take against the back of the saw, one of the blocks 88 being fitted between the outer end of the brace 85 and the upper pair of cheeks 81 and the other of which is fitted upon the lower portion of the blade 82 adjacent the lower cheeks 81.

The block 86 in addition to its coöperation with the brace 85 serves as a stop to limit the inward movement of the planer frame 41 and has its length selected with this latter function in view.

The length of the saw 1 operating between the rolls 4 and 5 is relatively close to the roll 4 and remote from the roll 5. This relation is selected in order that the entire bark surface of a tree of average diameter may be utilized in the production of a maximum number of commercially satisfactory hoop-lengths. Thus it is possible to remove four hoop-lengths from the average tree. In other words, the chord formed by the saw relatively to the circumference of the tree subtends an arc equal to one-fourth of said circumference. When a hoop-length is removed the tree is turned to present a further area of its circumference to the saw and is again passed through the machine. This operation is repeated until substantially all the bark surface of the tree has been utilized.

The hoop-lengths produced by the action of the saw between the rolls 4 and 5 have such width, in the majority of cases, that it is practical to split or re-saw them and thus double the hoop-yielding capacity of the tree. In the main sawing operation above described, the length of the saw at the right of the machine, (Fig. 2 of the drawings being considered), being the length which operates between the rolls 4 and 5, is utilized. In the splitting or re-sawing operation, the length of the saw at the left of the machine is utilized.

The splitting or re-sawing instrumentality comprises, in addition to the length of the saw at the left of the machine, a pair of grooved guide rolls 89 supported horizontally in co-planar relation at the forward and upturned free ends of a horizontal generally U-shaped spring 90 secured at its rear or bow portion by bolts or other suitable fastenings to a supporting plate 91 which extends between the frame bars 9. In the rear of the rolls 89 and between the legs of the spring 90, the plate 91 carries a suitably raised guide plate 92, the office of which is to accurately direct the hoop-length to be resawed between the rolls 89. A bar 93 is arranged under the front end of the plate 92 and takes up the normal space between the leg of the spring 90, the function of the bar 93 being to prevent the rolls 89 from striking against one another when the hoop-length passes from the machine.

Vertical guard plates 94 are provided above and below the rolls 89 and in the space between said guard plates a horizontal ledge 95 is arranged, said ledge being secured upon the front frame bar 9. The ledge 95 is used to support a saw guide means (Figs. 11 and 12) which comprises a block 96 resting upon said ledge, a plate 97 resting upon said block, spaced cheeks 98 carried by said plate, screws 99, preferably of hard wood, carried by said cheeks and arranged at opposite sides of the saw blade to guide and steady the same and a guide member 100 for the back of the saw, the member 100 being suitably fitted upon the cheeks 98. The saw guide means is held in position by a bolt fastening 101 passing through the plate 97, the block 96, and the ledge 95. The plate 97 has a slot through which the bolt of the fastening 101 extends and which permits suitable adjustments of said plate on the block 96. The ledge 95 has an edge recess 102 through which the bolt of the fastening 101 extends and which permits of the removal and replacement of the guide means as a unit relatively to said ledge.

A block 103 having a slot for the saw is secured to the upper guard plate immediately above the rolls 89 and said rolls are held lightly by the spring 90 against the underface of this block, the latter having on its underface suitable wear pieces for contact with the rolls. The block 103 serves a three fold purpose, viz. it aids in guiding the saw, it insures the co-planar relation of the rolls and it prevents the rear end of the hoop-length (which is frequently of diminished width) from being carried by the saw over the upper saw pulley 2.

For the support of the hoop-length which passes between the rolls 89, cross bars 104 and 105 are provided. The cross bar 104 is arranged at the rear end of the plate 91 and prevents the hoop-length from catching against protruding bolt heads or similar obstructions. The cross bar 105 is arranged beyond the front of the machine, suitably in advance of the rolls 89 and is mounted upon a bracket composed of telescoping members 106 and 107, the latter having at its inner end a downward extension which is fitted in a suitable clamp 108 secured to the front bar 9 and which, when the members of said clamp are loosened, may be moved pivotally therein. The distance of the cross bar 105 from the rolls 89 is determined by suitably adjusting the telescoping members 106 and 107, said members being normally held against relative movement by set screws. When a band saw is to be fitted to or removed from the machine, the members of the clamp 108 are first loosened and thereupon the bracket which carries the cross bar 105 and therewith said cross bar are swung to one side, as shown by dotted lines, in order that they may not be in the way during the assemblage or removal of the saw.

It is preferred that one of the rolls 89 shall be positively driven in order that said rolls may serve not only for supporting and guiding the hoop-length to be split or resawed but for feeding the same to the saw. For this purpose, the hub at the under side of the inner roll 89 is formed as a worm wheel 109 and is constantly engaged by a worm 110 mounted on a shaft 111. The shaft 111 carries at its rear end a belt pulley 112 and is driven by a belt 113 from a pulley mounted on the power shaft 8. The shaft 111 is journaled in front and rear bearings 114 and 115, the bearing 114 being mounted on a bracket 116 or arm secured to the leg of the spring 90 which carries the inner roll 89 and the bearing 115 being mounted on a bracket 117 secured to the plate 91. The pulley 112 has its belt engaging portion dished or cupped and the bracket 117 has a laterally springy, rearwardly directed end which projects into the cavity of the pulley 112 (Fig. 18) and which carries the bearing 115, the latter having its underface recessed to fit over the end of said bracket. The bearing 115 is thus located within the belt engaging portion of the pulley 112 and in line with the center of said belt engaging portion, the object of this arrangement being to balance the pull produced by the action of the belt 113 and to insure that the lateral movements of the arm of the spring 90 which carries the inner roll 89 shall not appreciably disturb the relation of the pulley and the belt 113. Stated otherwise, when the arm of the spring 90 which carries the inner roll 89 yields laterally in either direction, its movement is transmitted to the shaft 111 owing to the connection, by virtue of the bracket 116, of the front ends of said shaft and said arm. The lateral movement of the shaft 111 is about the center of the bearing 116 as a fulcrum, but inasmuch as this center coincides with a vertical central diameter of the belt engaging portion of the pulley 112 and inasmuch as the lateral yielding movement of the shaft 111 is relatively slight, the pivotal displacement of the pulley 112 about said vertical diameter thereof as an axis will be negligible and will not have any practical effect on the relation of said pulley and the belt 113.

The invention also includes means, (Figs. 3 to 7), for regulating the tension of the band saw 1. The bearings 118 for the shaft 7 which carries the principal band saw pulley 2 are slidable in openings provided for their accommodation near the upper ends of the upright frame bars 6. Said bearings carry below the shaft 7 an adjusting shaft 119 which is provided at its end with eccentrics 120, preferably of the two-part construction. The eccentrics 120 are fitted in eccentric straps 121 which have their lower ends secured upon a transverse bar 122 fixedly supported between the bars 6. The shaft 119 is provided with an operating handle 123 by means of which said shaft may be rocked. Obviously, when the shaft 119 is rocked, the bearings 118 and therewith the shaft 7 and wheel 2 are raised or lowered in accordance with the direction of turning movement of the shaft 119. When the bearings 118 are raised, the tension of the band saw is increased, and when the bearings 118 are lowered, the tension of the band saw is decreased. In order to prevent accidental turning movement of the shaft 119, a two-part clamp 124 is employed. The clamp 124 is adjusted to engage the shaft 119 with clamping pressure and its lower end is bifurcated as at 125 to straddle the rod 122.

The frame bars 6 above the bearings 118 are provided with openings through which project oil tubes 126 carried by said bearings.

As previously explained, several hoop-lengths, usually four, are severed from the same tree. The tree, after a hoop-length has been sawed therefrom, is returned by an operator at the front of the machine to an operator at the rear of the machine who starts the feed of the tree through the machine for the purpose of sawing another hoop-length therefrom. To facilitate the return of the tree to the rear of the machine, supporting and guiding members 127 and 128 are provided. These members are of general U-shape, the member 127 being fixed on the upper end of the rod 12 which forms the axis of the pressure roll 5 and the member 128 being fixed on the arm 23 by which said pressure roll is moved, manually, away from the feed roll. The members 127 and 128 are disposed transversely of the direction of return movement of the tree and form rests for the tree during its return movement. The member 127 has an abruptly upturned portion 129 at its inner end which prevents the tree from sliding laterally toward the saw and at its outer end it has an outwardly and gradually inclined portion 130 which permits a lateral outward movement of the tree relatively to said member and prevents the tree in any lateral outward movement thereof from pulling the roll 5 away from the roll 4. Thus it may happen that the operator who receives the tree will carelessly move or jerk the rear end of the tree inwardly in removing the tree from the rests 127 and 128. In such a case, the front end of the tree will swing outwardly but inasmuch as the outer end of the member 127 is gradually inclined, the front end of the tree, in its outward swinging movement, will merely slide over or off said member but will not catch against the same and hence will not pull the roll 5 away from the roll 4. This is important because it may happen that the return of a tree to the rear of the machine is effected simultaneously with the passage of another tree through the machine and it is therefore requisite that the relation of the pressure roll 5 should not be disturbed. The member 128 is set slightly inwardly of the member 127 and has at its inner side a depression 131 in which the tree rests during its return movement, this depression being so located as to cause the return of the tree to the operator at a place most convenient for its further manipulation in starting its next feeding movement toward the saw.

It has been found in practice that the machine herein described operates in a thoroughly satisfactory manner on trees of either maximum or minimum diameter for the purpose in view, and that its operation is not detrimentally affected by surface irregularities of such trees or by variations, e. g., bends or crooks, in their general outline, irregularities in the outline of the tree being compensated for by the yieldable mounting of the pressure roll 5, of the planer frame 41, and pressure roll 43, which rolls and planer frame swing laterally on their pivots in accordance with variations in the outline of the tree and of the idlers 24 and 25.

Having fully described my invention, I claim:—

1. In a machine of the type set forth, in combination, a band saw, stock guiding means in relation to which said band saw works, a guide for said saw comprising an upright forwardly projecting frame rigidly mounted at its lower end provided with saw guiding means and with a blade in advance of the saw guiding means to engage in the kerf produced by the saw means for bracing the upper end of said frame to an element of said stock guiding means to prevent lateral springing thereof due to the side pressure of the tree upon which the saw acts.

2. In a machine of the type set forth, in combination, a band saw, upright rolls between which the saw works, and a guide for the saw comprising an upright frame projecting forwardly and laterally at an angle to the stock passing between the rolls and having at its rear end saw guiding means and a blade in advance of the saw guiding means to engage in the kerf produced by the saw, and means for bracing said frame relative to one of said rolls.

3. In a machine of the type set forth, in combination, an upright feed roll mounted in a stationary axis, an upright pressure roll coacting with the feed roll, an upright saw working between said rolls, a yieldable mounting for the pressure roll, a knot planer working in the rear of the feed roll, a yieldable mounting for the knot planer, a second pressure roll working in the rear of the first pressure roll and coacting with the knot-planer, a yieldable mounting for the second pressure roll, and means automatically permitting the yielding of the pressure rolls and the knot planer for constantly and automatically urging them against the tree fed to the saw.

4. In a machine of the type set forth, in combination, an upright saw, upright coacting feed and pressure rolls between which the saw works, one of said rolls being yieldably mounted and being urged toward the other roll and means for supporting the work during its passage through said rolls including a freely rotatable transverse idler mounted for lateral yielding movement in either direction of its axis and means for automatically alining said idler with the space between said rolls.

5. In a machine of the type set forth, in combination, an upright saw, upright coacting feed and pressure rolls between which the saw works, one of said rolls being yieldably mounted and being urged toward the other roll and means for supporting the work during its passage through said rolls including a transverse idler, a transverse rod on which the idler is freely rotatable, and grooved pulleys supporting the ends of said rod in the grooves thereof, whereby the rod and idler may have reciprocatory movement together in the direction of their axes.

6. In a machine of the type set forth, an endless upright band saw, coacting feed and pressure rolls between which one run of the band saw works, a power shaft for the band saw, gearing connecting said power shaft and the feed roll, a second pair of rolls between which the other run of the band saw works, the latter rolls being formed to guide a severed hoop-length to the saw, and gearing between said power shaft and one of the rolls of said second pair.

7. In a machine of the type set forth, in combination, an upright band saw, a positively driven feed roll at one side thereof, a yieldably mounted pressure roll at the other side thereof, a frame carrying said pressure roll and having a vertical pivotal extension, a machine frame and a bearing for said extension adjustably clamped to said machine whereby said pressure roll may be set even with or slightly behind said feed roll.

8. In a machine of the type set forth, in combination, an upright band saw, coacting upright feed and pressure rolls between which said band saw works, a frame carrying the pressure roll and a rest mounted on said frame above the pressure roll for supporting and guiding a tree during its return from the front to the rear of the machine.

9. In a machine of the type set forth, in combination, coacting upright feed and pressure rolls, a band saw working between said rolls, a frame carrying the pressure roll and having a vertical pivotal extension, the frame performing a rocking movement about said extension, and a generally U-shaped rest mounted on said frame above the pressure roll for supporting and guiding a tree during its return from the front to the rear of the machine.

10. In a machine of the type set forth, in combination, coacting upright feed and pressure rolls, a band saw working between said rolls, a frame carrying the pressure roll and having a vertical pivotal extension, the frame performing a rocking movement about said extension, and a generally U-shaped rest, mounted on said frame above the pressure roll for supporting and guiding a tree during its return from the front to the rear of the machine, the rest having its end adjacent the saw abruptly upturned and having its other end inclined gradually outwardly and upward.

11. In a machine of the type set forth, in combination, coacting upright feed and pressure rolls, a band saw working between said rolls, a frame carrying the pressure roll and having a vertical pivotal extension, the frame performing a rocking movement about said extension and generally U-shaped rests mounted in front and rear relation on said frame above the pressure roll for supporting and guiding a tree during its return from the front to the rear of the machine, the front rest having its end adjacent the saw abruptly upturned and having its other end inclined gradually outward and upward and the rear rest having a depression at the end thereof adjacent the saw.

12. In a machine of the type set forth, in combination, an upright band saw, coacting feed and pressure rolls between which said band saw works, a laterally yieldable frame carrying the pressure roll, and a generally U-shaped rest mounted on said frame above the pressure roll for supporting and guiding a tree during its return from the front to the rear of the machine, the rest having its end adjacent the saw abruptly upturned and having its other end inclined gradually outward and upward.

13. In a machine of the type described, in combination, a machine frame, an upright saw on the frame, a stationary feed roller on the frame adjacent the saw, a swinging frame on said first-mentioned frame, a pressure roller carried by said swinging frame and adapted to co-act with said stationary feed roller for feeding stock to the saw, said swinging frame being mounted to admit of a yielding adjustment substantially radially of said feed roller, and means for adjusting the swinging frame in a plane parallel to the line of feed of the stock.

14. In a machine of the type described, in combination, a machine frame, an upright saw on the frame, a stationary feed roller on the frame disposed adjacent the saw, a pressure roller on the frame co-acting with the feed roller and adapted to feed stock to the saw, a horizontal swinging frame arranged to the rear of said stationary feed roller, a rotating knot planer carried on said last-mentioned frame, a second horizontally swinging frame arranged on the first-mentioned frame to the rear of said pressure roller, an idler roller carried by said second swinging frame adapted to coact with said planer, and a retractile element connecting both of said swinging frames, substantially as described.

In testimony whereof I have hereunto set my hand in presence of two subscribing witnesses.

CHARLES HAROLD SPOONER.

Witnesses:
STEPHEN L. PEABODY,
GEORGE B. McKECHNIE.